(12) United States Patent
Anderson et al.

(10) Patent No.: US 7,316,586 B2
(45) Date of Patent: Jan. 8, 2008

(54) POWER SOURCING UNIT FOR POWER OVER ETHERNET SYSTEM

(75) Inventors: John Anderson, Eden Prairie, MN (US); Gordon P. Clark, Eden Prairie, MN (US); Loren J. Mattson, Richfield, MN (US); Steve Johnson, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 175 days.

(21) Appl. No.: 10/843,216

(22) Filed: May 11, 2004

(65) Prior Publication Data
US 2005/0264981 A1 Dec. 1, 2005

(51) Int. Cl.
*H01R 25/00* (2006.01)
(52) U.S. Cl. .................................... 439/638
(58) Field of Classification Search ............... 439/638, 439/639, 59, 540, 62; 361/683, 695, 727, 361/797, 90; 709/250; 713/300; 307/147
See application file for complete search history.

(56) References Cited

U.S. PATENT DOCUMENTS

| | | | |
|---|---|---|---|
| 4,669,916 A * | 6/1987 | White et al. ............. | 405/224 |
| 4,733,389 A | 3/1988 | Puvogel | |
| 5,406,260 A | 4/1995 | Cummings et al. | |
| 5,589,833 A * | 12/1996 | Randall et al. ........... | 342/195 |
| 5,994,998 A | 11/1999 | Fisher et al. | |
| 6,115,468 A | 9/2000 | De Nicolo | |
| 6,140,911 A | 10/2000 | Fisher et al. | |
| 6,218,930 B1 | 4/2001 | Katzenberg et al. | |
| 6,329,906 B1 | 12/2001 | Fisher et al. | |
| 6,348,874 B1 | 2/2002 | Cole et al. | |

(Continued)

FOREIGN PATENT DOCUMENTS

WO  WO 95/14965  6/1995

OTHER PUBLICATIONS

3Com Corporation, "3Com® Power over Ethernet Multiport Midspan Solution Product #: 3CNJPSE24—Features, Benefits & Specifications," http://www.3com.com/products/en_US/printsafe.jsp?sku=3CNJPSE24&pathtype=purchase, 4 pages (date printed May 26, 2004).

(Continued)

*Primary Examiner*—Alexander Gilman
(74) *Attorney, Agent, or Firm*—Merchant & Gould P.C.

(57) ABSTRACT

A power sourcing unit for a power over ethernet system. The unit includes a chassis with a power supply guide and a CPU guide, and a power supply including a power supply connector. The unit also includes a printed circuit board including first and second connectors and being coupled to a plurality of RJ-45 jacks, and a CPU line card including a CPU connector. The power supply guide engages the power supply to allow the power supply to be slid into and out of the unit to couple the power supply connector to the first connector of the printed circuit board. The CPU guide engages the CPU line card to allow the CPU line card to be slid into and out of the unit to couple the CPU connector to the second connector of the printed circuit board. The CPU line card allows the unit to be coupled to a network. Multiple power sourcing units can be daisy-chained together.

11 Claims, 16 Drawing Sheets

U.S. PATENT DOCUMENTS

| | | | |
|---|---|---|---|
| 6,396,391 | B1 | 5/2002 | Binder |
| 6,448,899 | B1 | 9/2002 | Thompson |
| 6,449,348 | B1 | 9/2002 | Lamb et al. |
| 6,459,275 | B1 | 10/2002 | Ewalt et al. |
| 6,473,608 | B1 | 10/2002 | Lehr et al. |
| 6,480,122 | B1 | 11/2002 | Oddy et al. |
| 6,496,105 | B2 | 12/2002 | Fisher et al. |
| 6,535,983 | B1 | 3/2003 | McCormack et al. |
| 6,546,494 | B1 | 4/2003 | Jackson et al. |
| 6,556,097 | B2 * | 4/2003 | Coffey ............... 333/24 R |
| 6,571,181 | B1 | 5/2003 | Rakshani et al. |
| 6,577,230 | B1 | 6/2003 | Wendt et al. |
| 6,603,220 | B2 | 8/2003 | Vergnaud |
| 6,643,566 | B1 | 11/2003 | Lehr et al. |
| 6,643,595 | B2 | 11/2003 | Rakshani et al. |
| 6,650,622 | B1 | 11/2003 | Austerman, III et al. |
| 6,654,236 | B2 * | 11/2003 | Chen et al. ............ 361/683 |
| 6,658,098 | B2 | 12/2003 | Lamb et al. |
| 6,701,443 | B1 | 3/2004 | Bell |
| 6,710,704 | B2 | 3/2004 | Fisher et al. |
| 6,715,087 | B1 | 3/2004 | Vergnaud et al. |
| 6,741,162 | B1 | 5/2004 | Sacca et al. |
| 6,753,761 | B2 | 6/2004 | Fisher et al. |
| 6,762,675 | B1 | 7/2004 | Cafiero et al. |
| 6,764,343 | B2 | 7/2004 | Ferentz |
| 6,938,181 | B1 * | 8/2005 | Talagala et al. ............ 714/7 |
| 2002/0144159 | A1 | 10/2002 | Wu et al. |
| 2002/0191553 | A1 | 12/2002 | Lehr et al. |
| 2003/0036819 | A1 | 2/2003 | Lehr et al. |
| 2003/0048606 | A1 | 3/2003 | Kim et al. |
| 2003/0099076 | A1 | 5/2003 | Elkayam et al. |
| 2003/0146765 | A1 | 8/2003 | Darshan et al. |
| 2003/0194912 | A1 | 10/2003 | Ferentz |
| 2004/0037300 | A1 | 2/2004 | Lehr et al. |
| 2004/0049321 | A1 | 3/2004 | Lehr et al. |
| 2004/0049359 | A1 | 3/2004 | Rakshani et al. |
| 2004/0095917 | A1 | 5/2004 | Lehr et al. |
| 2004/0095933 | A1 | 5/2004 | Lehr et al. |
| 2004/0107334 | A1 | 6/2004 | Hatte |
| 2004/0156496 | A1 | 8/2004 | Karam |

OTHER PUBLICATIONS

3Com Corporation, "Ethernet Power Supply 3CNJPSE24 User's Guide," Front cover and 2 page introduction, pp. I-IV, pp. 1-1-1-7, pp. 2-1-2-3, pp. A-1-A-4, pp. B-1-B-2, pp. C-1-C-5, 4 pages Warranty, Back cover (Nov. 2001).

Proposal by: Amir Lehr—PowerDsine Ltd., DTE Power via MDI Method for Powered DTE (PDTE) Authentication, pp. 1-14 (Jan. 20, 2000).

Proposal by: Amir Lehr—PowerDsine Ltd., "DTE Power via MDI Delivery of *Power* in addition to *Data* over Ethernet cabling infrastructure," pp. 1-10 (Jul. 6, 1999).

The Institute of Electrical and Electronics Engineers, Inc., "IEEE Standards 802.3af™," pp. I-X and pp. 1-121 (Jun. 18, 2003).

* cited by examiner

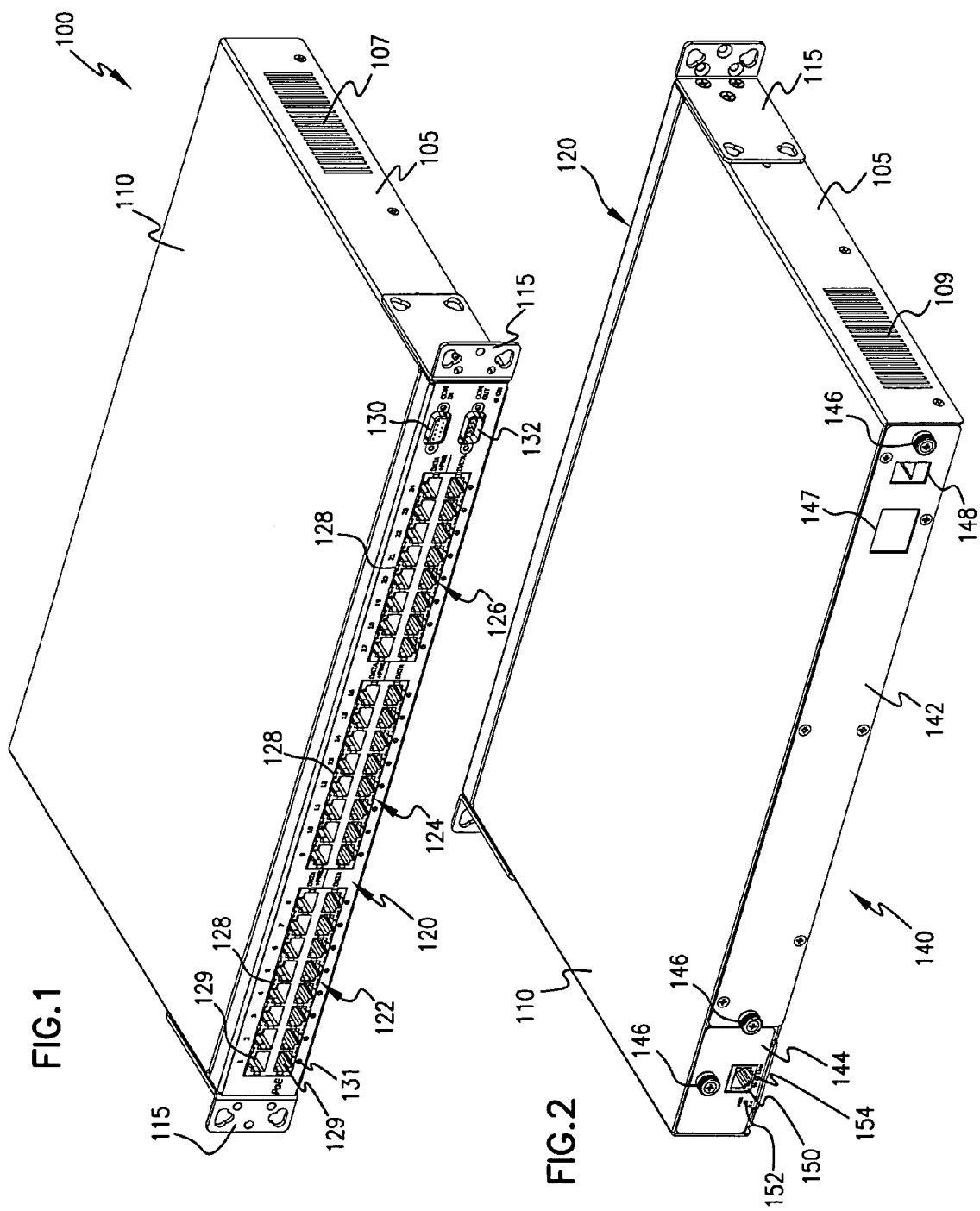

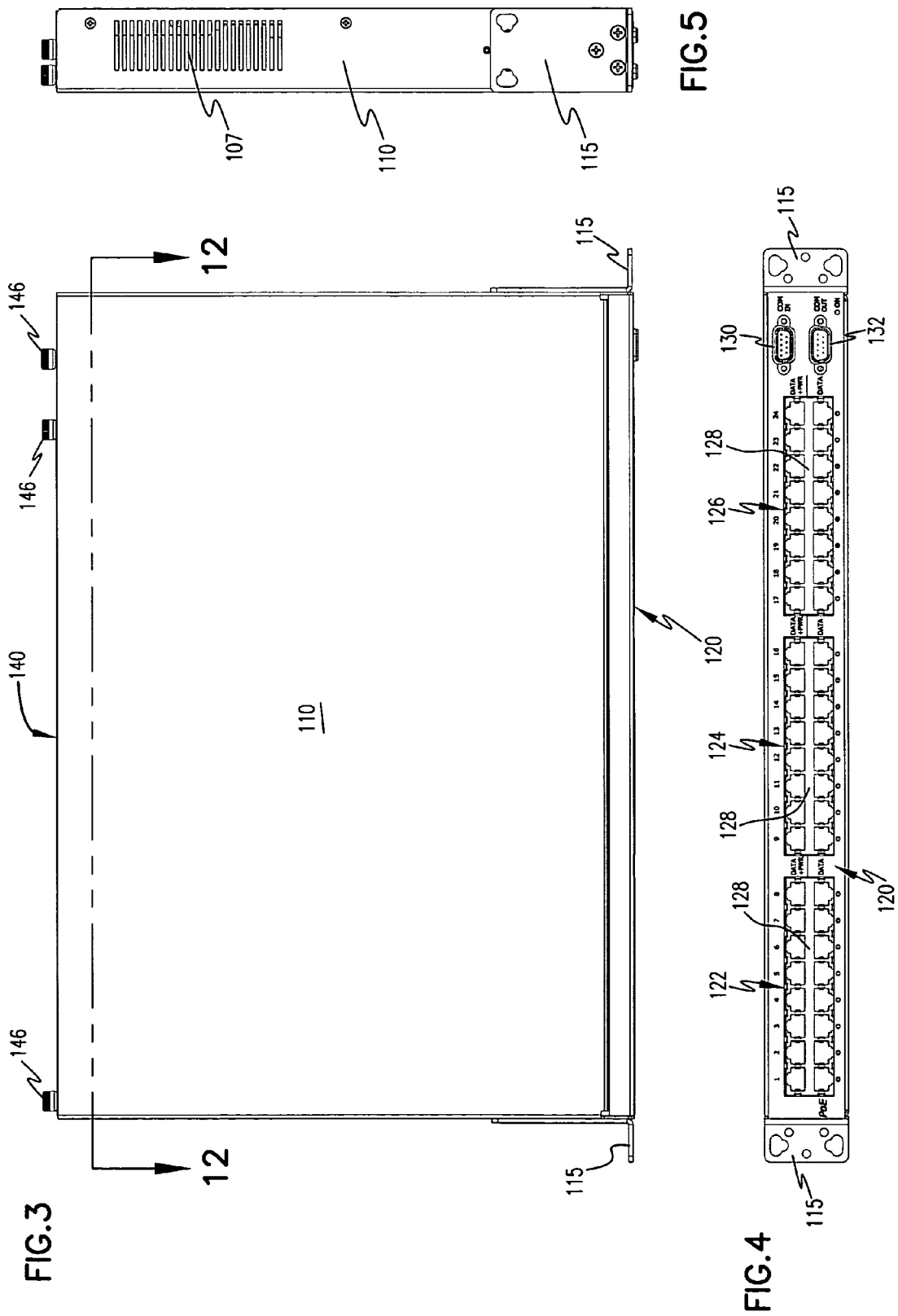

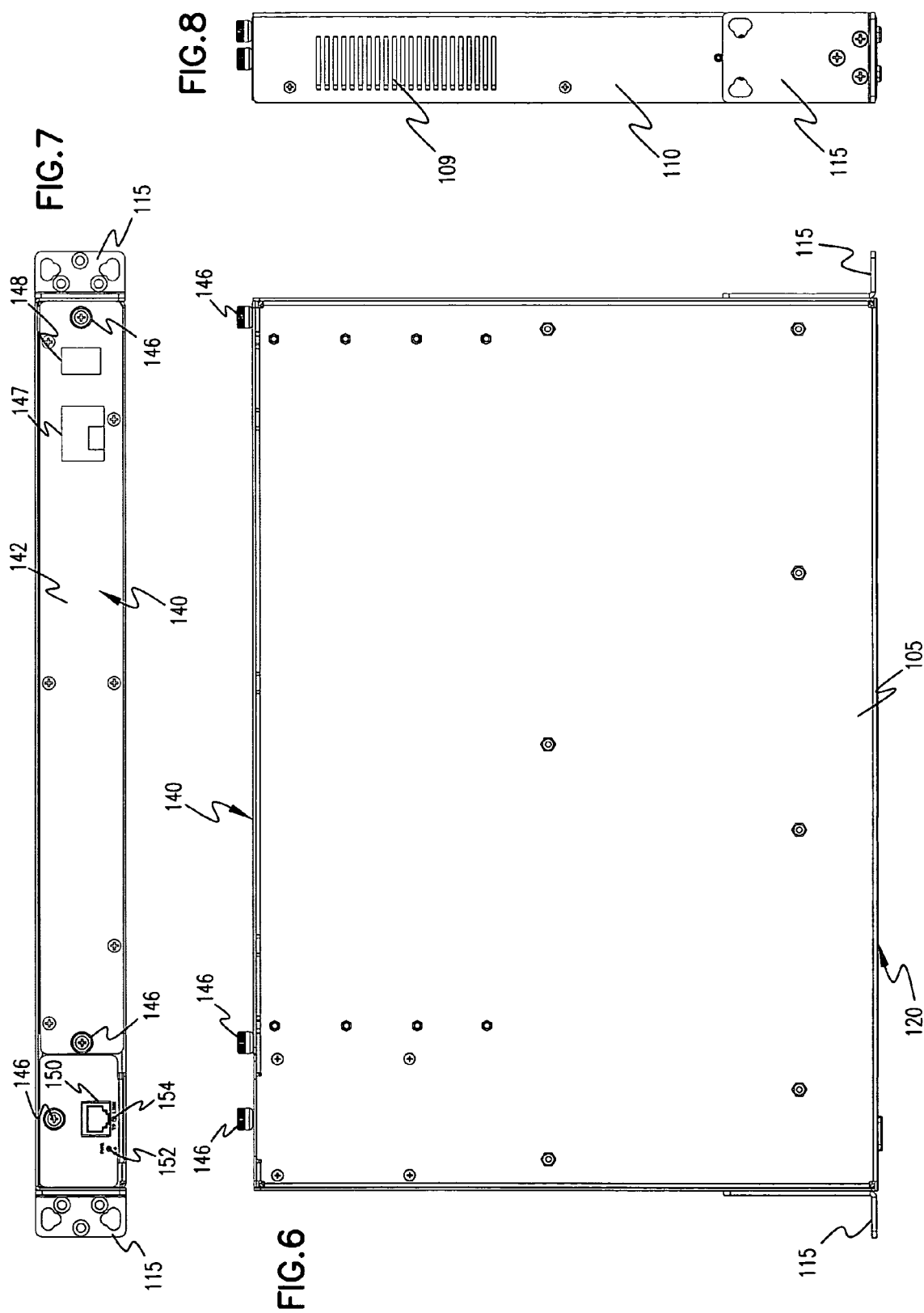

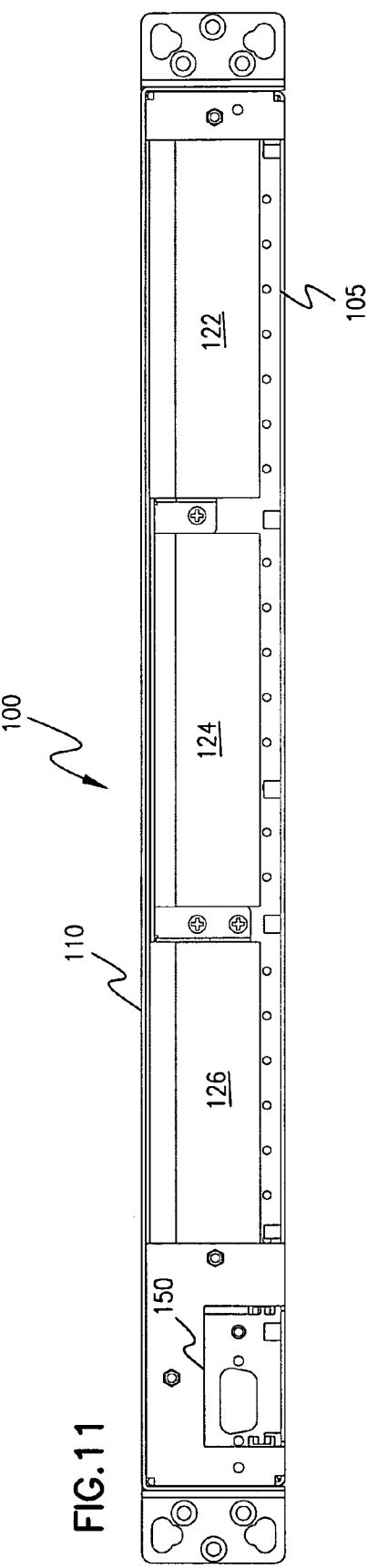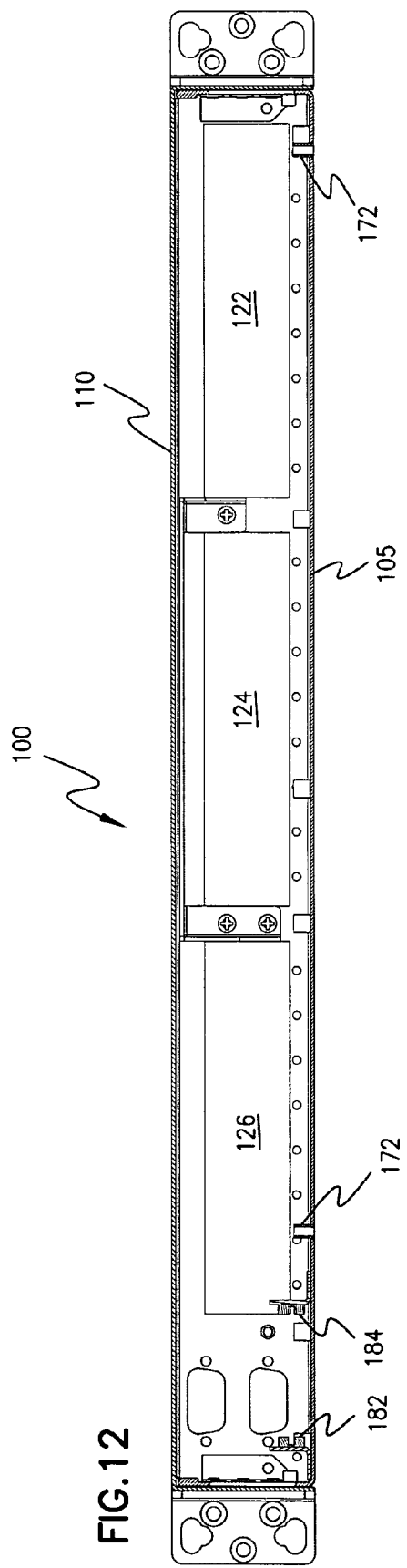

POWER SOURCING UNIT FOR POWER OVER ETHERNET SYSTEM

TECHNICAL FIELD

The present invention relates to systems and methods for the distribution of data and power over a local area network, and, more particularly, to power over ethernet power sourcing units.

BACKGROUND

Interest in power over ethernet technology has increased with the adoption of the power over ethernet IEEE 802.3af standard in June of 2003. Generally, power over ethernet technology allows standard ethernet cables to carry not only data signals, but also power to the devices connected to the cables. In this manner, power can be provided by the ethernet cable itself, rather than requiring a separate source of power for the connected devices.

The standard requires a power sourcing unit, which supplies up to 15.4 watts of power (at 48 volts) to a powered device. The standard utilizes pins 1/2 and 3/6, or pins 4/5 and 7/8, of the eight-pin ethernet cable for both data and power transfer. To avoid damaging non-compliant devices that may be connected to the power over ethernet system, the standard specifies a method for detecting compliant devices by applying a small, current-limited voltage to check for the presence of a 25 k ohm impedance in the connected device. Only if the power sourcing unit detects this impedance is the full 48 volts applied.

There are many potential applications for power over ethernet technology. For example, wireless access points can be placed at desired locations throughout a building without requiring a separate source of power. Another potential application includes internet protocol (IP) telephones, for which a central power supply with a backup uninterrupted power supply (UPS) is desirable. Other applications for which this technology may be desirable include IP cameras, security badge readers, etc.

The advantages associated with power over ethernet technology can include: reduced cabling costs, because both power and data are provided over a single ethernet cable; increased reliability, because a centralized power source can utilize an UPS to guarantee uninterrupted power to all powered devices; and increased network management, to allow powered devices to be monitored and controlled remotely.

It is desirable to provide enhanced functionality for the power sourcing units of power over ethernet systems.

SUMMARY

Embodiments of the present invention are directed to systems and methods for the distribution of data signals and power over a local area network, and, more particularly, to power over ethernet power sourcing units.

In one embodiment, a power sourcing unit includes a chassis, a plurality of jacks, a printed circuit board, and a removable power supply. In one embodiment, the unit also includes a removable CPU line card that allows the unit to be connected to a network.

In one embodiment, the power supply and the CPU line card are removable from the power sourcing unit without requiring a cover of the unit to be removed.

In some embodiments, multiple power sourcing units can be daisy-chained together.

The above summary of embodiments made in accordance with the present invention is not intended to describe each disclosed embodiment or every implementation of the present invention. The figures and the detailed description that follow more particularly exemplify embodiments of the invention. While certain embodiments will be illustrated and described, the invention is not limited to use in such embodiments.

BRIEF DESCRIPTION OF THE DRAWINGS

FIG. 1 is a front perspective view of an example power sourcing unit of a power over ethernet system.

FIG. 2 is a back perspective view of the power sourcing unit of FIG. 1.

FIG. 3 is a top view of the power sourcing unit of FIG. 1.

FIG. 4 is a front view of the power sourcing unit of FIG. 1.

FIG. 5 is a right side view of the power sourcing unit of FIG. 1.

FIG. 6 is a bottom view of the power sourcing unit of FIG. 1.

FIG. 7 is a back view of the power sourcing unit of FIG. 1.

FIG. 8 is a left side view of the power sourcing unit of FIG. 1.

FIG. 11 is a back view of the power sourcing unit of FIG. 1 with some components removed.

FIG. 12 is a cross-sectional view taken along line 12-12 of the power sourcing unit of FIG. 3 with some components removed.

DETAILED DESCRIPTION OF THE PREFERRED EMBODIMENT

Figure 9:
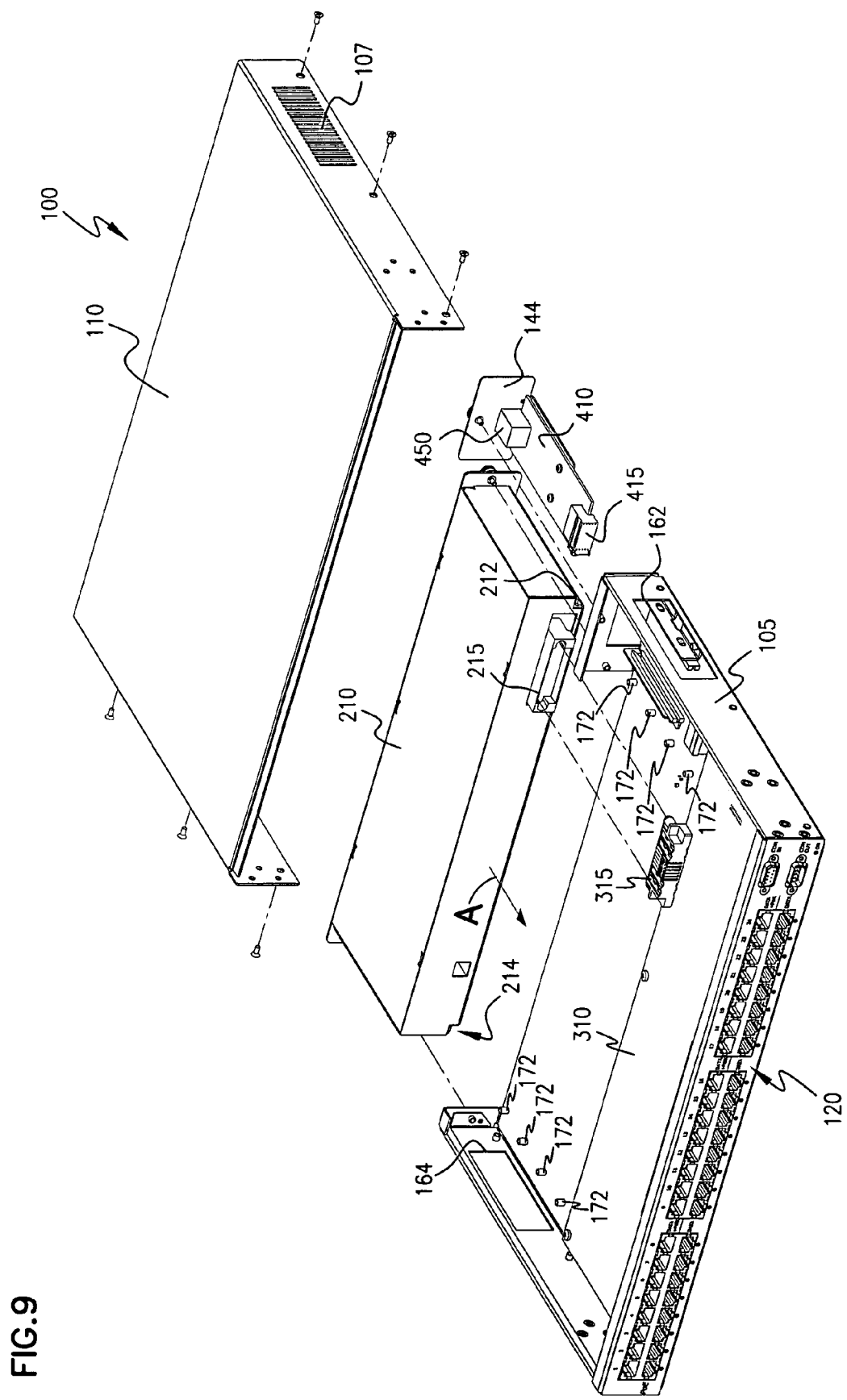
FIG. 9 is a front perspective view of the power sourcing unit of FIG. 1 with some components shown in exploded form.
Figure 10:
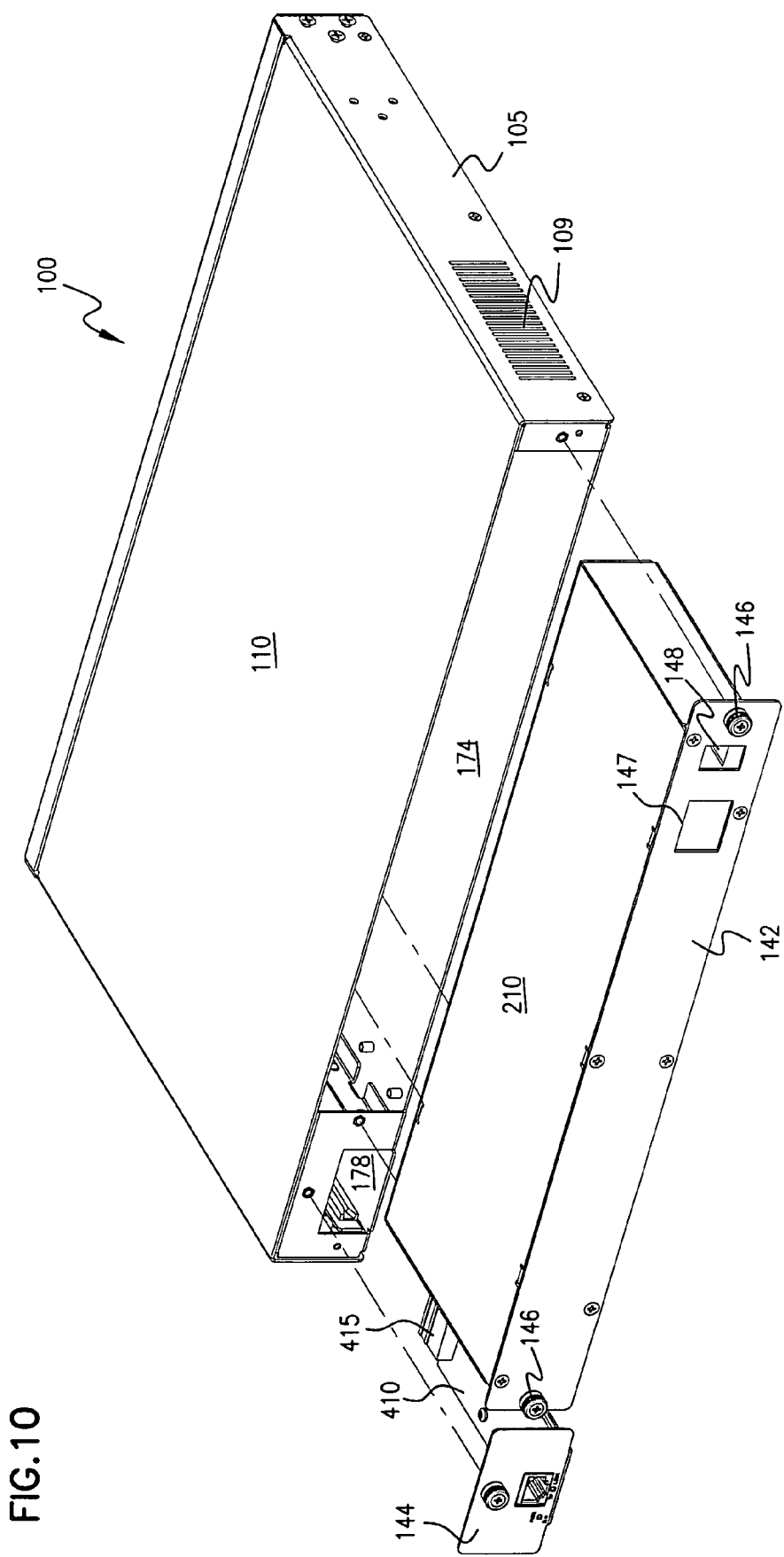
FIG. 10 is a back perspective view of the power sourcing unit of FIG. 1 with some components shown in exploded form.
Figure 13:
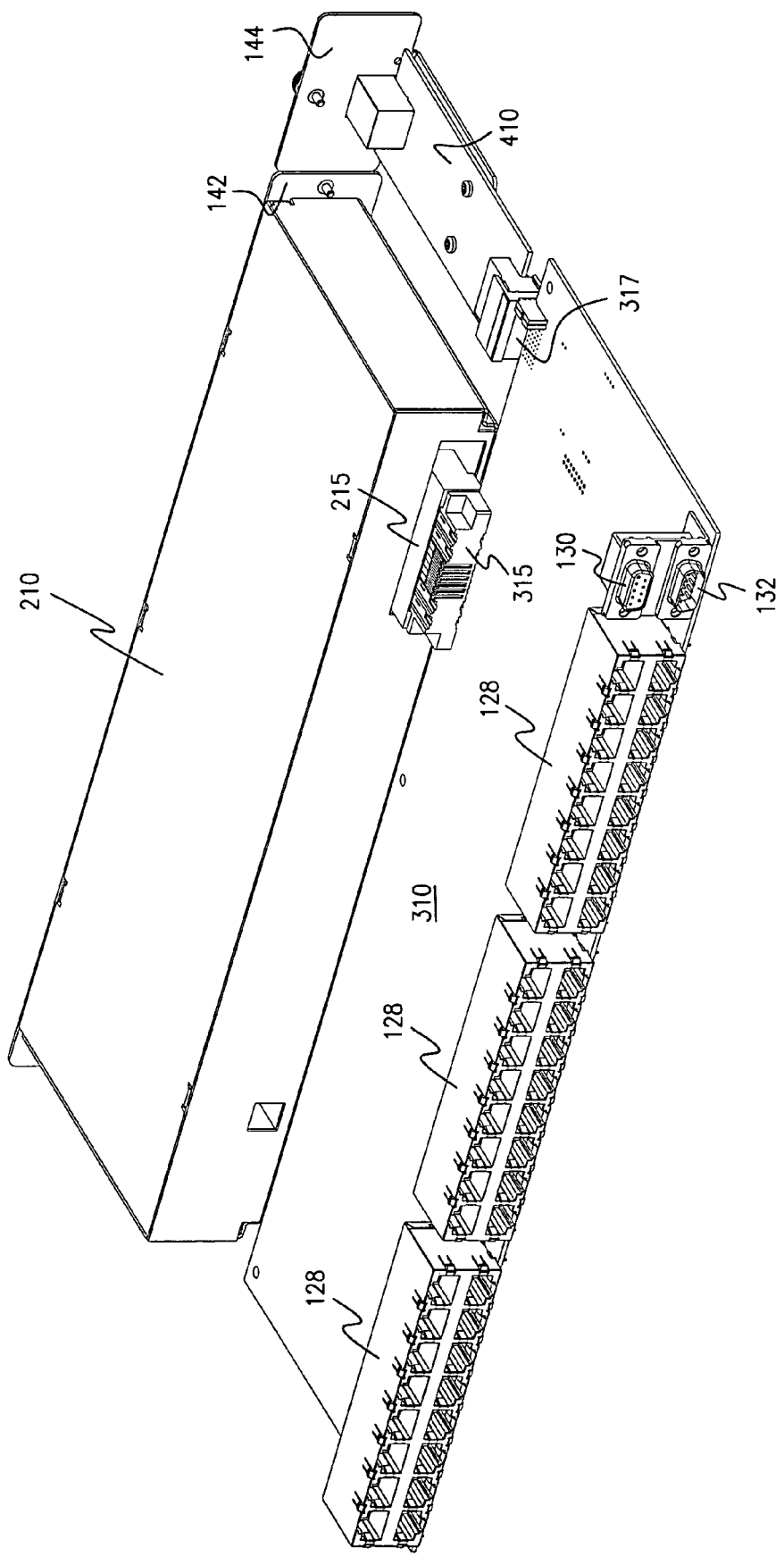
FIG. 13 is a front perspective view of example internal components of the power sourcing unit of FIG. 1.
Figure 14:
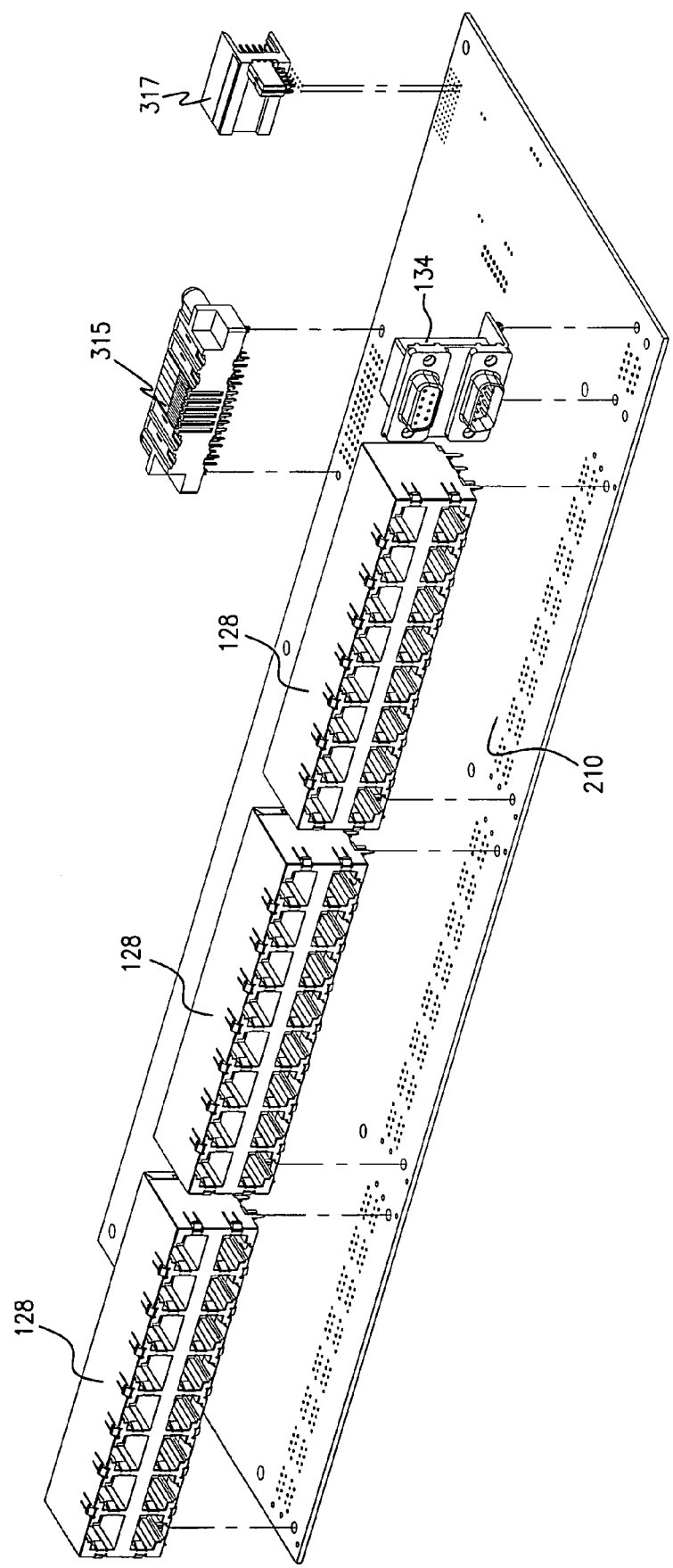
FIG. 14 is a front perspective view of an example circuit board of the power sourcing unit of FIG. 13 with some components shown in exploded form.

Embodiments of the present invention are directed to systems and methods for the distribution of data signals and power over a local area network, and, more particularly, to power over ethernet power sourcing units. Example embodiments illustrated herein are power sourcing units made in compliance with the IEEE Std. 802.3af™-2003, which is incorporated by reference herein in its entirety. The power sourcing units described herein are configured to deliver both data signals and power over an ethernet cable to a powered device.

Referring now to FIGS. 1-9, an example embodiment of a power sourcing unit 100 of a power over ethernet system is shown. The unit 100 generally includes a chassis 105 and a cover 110 that is removably coupled to the chassis 105. Also included are brackets 115 that can be used to couple the unit 100 to, for example, a rack. In the example embodiment, the chassis 105 and cover 110 are made of metal.

A front surface 120 of the chassis 110 includes a plurality of apertures 122, 124, and 126 that are sized to accept a plurality of port modules 128, each including a plurality of jacks 129. In the example shown in FIGS. 1-8, the unit 100 includes three port modules 128, each port module 128 including sixteen (16) jacks 129. More or fewer port modules 128 can be provided, as described further below.

In the example shown, each of the jacks 129 of the port module 128 is an RJ-45 jack. The jacks 129 in each port module 128 are arranged vertically in pairs so that an ethernet cable carrying a data signal from, for example, an ethernet switch can be coupled to a lower jack 129, and an ethernet cable to, for example, a powered device can be coupled to the corresponding upper jack 129 to carry the data signal and power from the unit 100 to a powered device. See FIG. 21 described below. An LED 131 positioned below each pair of jacks 129 indicates power for that pair of jacks 129.

Figure 22:
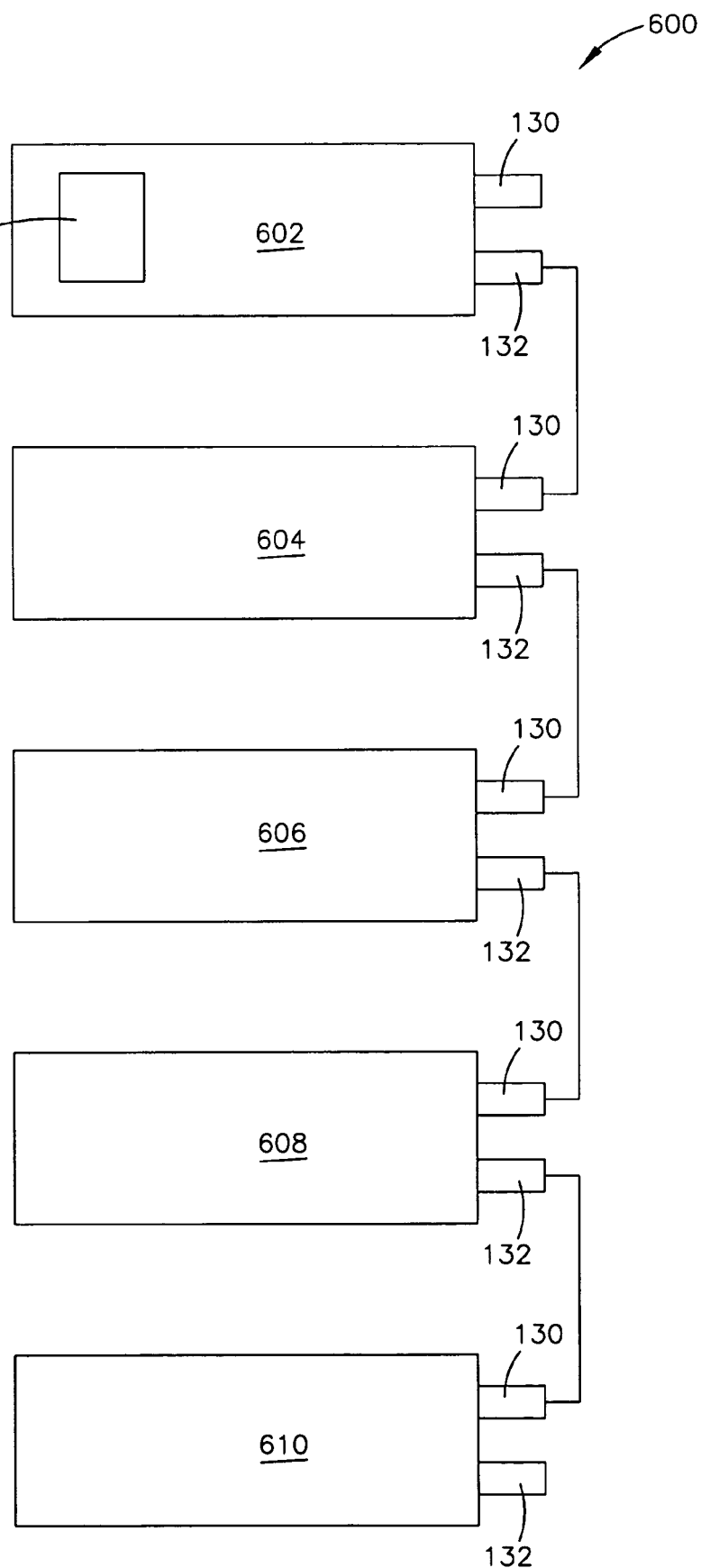
FIG. 22 is a schematic view of another example power over ethernet system including a plurality of interconnected power sourcing units.

Also included on the front surface 120 of the chassis 105 are a COM-in port 130 and a COM-out port 132. In the example shown, the COM-in port 130 and the COM-out port 132 are each standard D-sub 9 pin connectors. As described further below with reference to FIG. 22, the COM-in port 130 and the COM-out port 132 can be used to couple multiple units 100 together.

As shown, for example, at FIGS. 1, 2, 5, and 8, the cover 110 includes slots 107 and 109 formed therein. The slots 107 and 109 are positioned to cover apertures 162 and 164 in chassis 105 (see FIG. 9). Heat generated within the unit 100 can be dissipated through the apertures 162, 164 and the slots 107, 109. For example, one or more fans associated with a power supply 210 (described further below) in the unit 100 can move air through the apertures 162, 164 and the slots 107, 109 of unit 100 to dissipate heat generated therein.

A back surface 140 of the unit 100 includes a power supply cover 142 and a CPU cover 144. The power supply cover 142 includes an aperture 147 to allow a power cord to be plugged into the unit 100 to power on the unit 100. In optional embodiments, the power supply cover 142 also includes an aperture 148 for receipt of a switch, such as a toggle switch, used to turn the unit 100 on and off. In the illustrated embodiment, the power supply cover 142 and the CPU cover 144 extend substantially an entire width of and cover the back surface 140 of the unit 100.

The CPU cover 144 includes an aperture 154 for a port 150 of a CPU line card 410. In addition, the CPU cover 144 includes an aperture 152 for an LED to indicate power to the CPU line card 410, as well as an aperture 154 for an LED to indicate network connectivity for the CPU line card 410. The CPU line card 410 is described further below with reference to FIGS. 16 and 17.

A plurality of fasteners 146 are used to couple the power supply cover 142 and the CPU cover 144 to the chassis 105 of the unit 100. The fasteners 146 are configured to allow either the power supply cover 142 or the CPU cover 144 to be independently removed from the chassis 105.

Referring now to FIGS. 9-17, the internal components of the unit 100 are illustrated. Unit 100 generally includes power supply 210, a printed circuit board 310, and an optional CPU line card 410.

The power supply 210, which is coupled to power supply cover 142, converts an alternating current (AC) power source to direct current (DC) to power the unit 100 and any powered devices coupled to the unit 100. In the example, the power supply 210 is a power supply with product no. DS625-9-401 manufactured by Astec Power of Carlsbad, Calif. In the example embodiment, the power supply 210 converts the AC power source to provide 48 volts DC to the printed circuit board 310. The power supply 210 includes a connector 215 that mates with a connector 315 mounted on the printed circuit board 310 to couple the power supply 210 to the printed circuit board 310. In the example shown, connector 215 is a port and connector 315 is a plug, although in alternative embodiments the locations of the port and plug can be interchanged.

The example power supply 210 includes slots 212, 214 running the depth of the supply 210. The slots 212, 214 correspond to guide pins 172 coupled to a bottom surface of the chassis 105. The power supply 210 can be slid into the unit 100 (see FIG. 10) by placing the power supply 210 into a cavity 174 formed between the chassis 105 and cover 110 at the back surface 140, and sliding the power supply 210 in a direction A so that the slots 212, 214 ride along the guide pins 172 until the connector 215 accepts connector 315 of the printed circuit board 310. Guide posts 316 on connector 315 (see FIG. 15) further guide the connector 315 into the connector 215. The fasteners 146 on the power supply cover 142 can then be tightened to lock the power supply 210 into place in the unit 100.

The power supply 210 can likewise be removed from the unit 100 by loosening the fasteners 146 and sliding the power supply 210 out of the cavity 174 in a direction opposite to that of direction A. The same or a different power supply 210 can then be placed into the cavity 174 as described above. In this manner, the power supply 210 is removable from the unit 100 without requiring the cover 110 to be removed from the chassis 105.

The printed circuit board 310 includes a plurality of logic components and a plurality of tracings etched thereon to electrically connect the various components mounted on the circuit board 310. Components on the printed circuit board 310 are powered through the conversion of the 48 volts DC provided by the power supply 210 to approximately 3.3 volts DC. In addition, the printed circuit board 310 delivers up to 48 volts DC to each jack 129 in each port module 128 that is connected to a powered device.

The printed circuit board 310 includes connector 315, port modules 128, and a COM module 134 including COM-in port 130 and COM-out port 132 mounted thereon. The printed circuit board 310 also includes a connector 317 for mating with a connector 415 of CPU line card 410.

Figure 15:
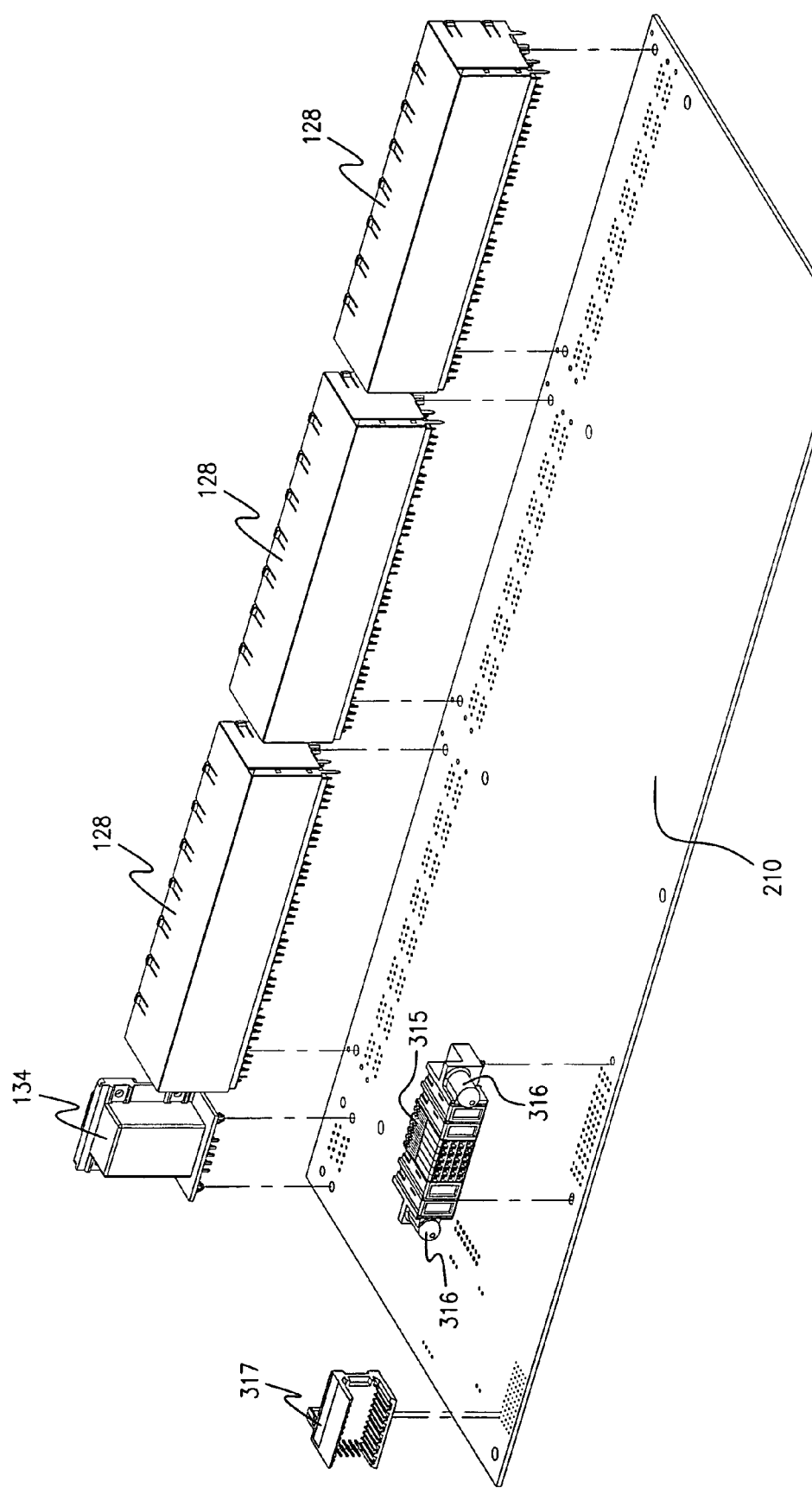
FIG. 15 is a back perspective view of the circuit board of FIG. 14 with some components shown in exploded form.
Figure 15A:
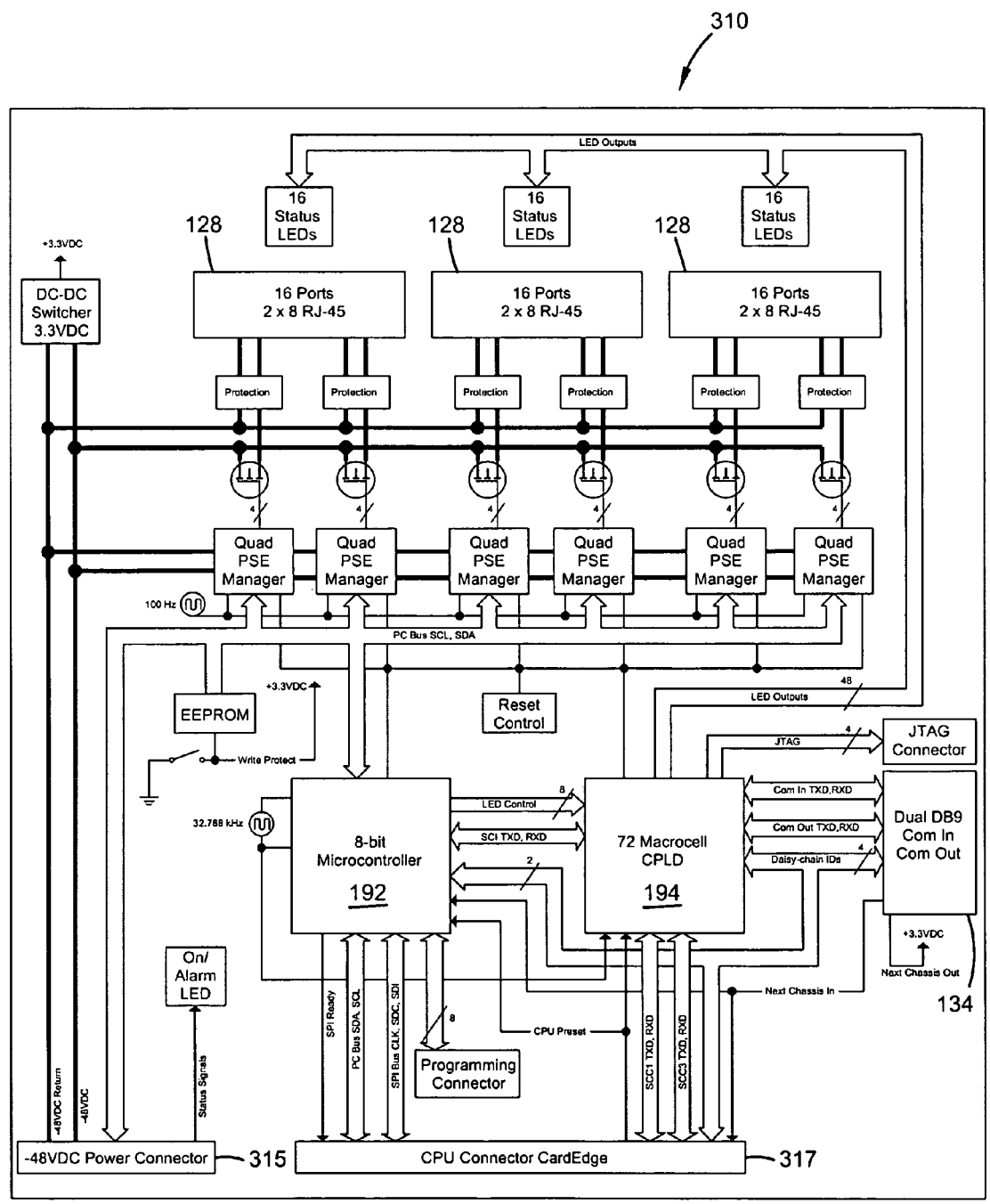
FIG. 15A is a schematic view of example components mounted on the circuit board of FIG. 14.

Referring now to FIG. 15A, the interconnection of example components mounted on printed circuit board 310 is shown. Generally, an 8-bit microcontroller 192 processes and controls other components on the printed circuit board 310 and, for example, communicates with power supply 210 and CPU line card 410, if present. In addition, a CPLD 194 functions to control various aspects of the unit 100 such as, for example, various LEDs and multiplex serial communication signals to the CPU line card 410 and microcontroller 192.

Figure 17:
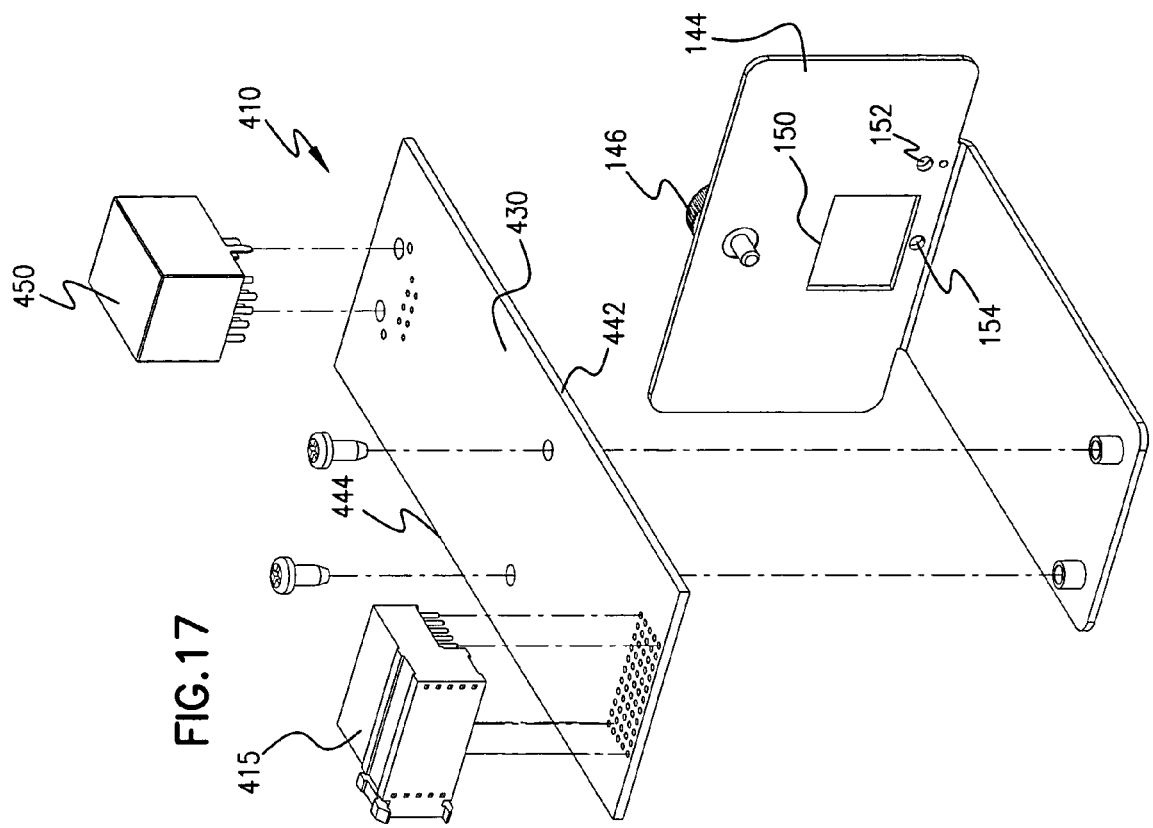
FIG. 17 is a back perspective view of the CPU line card of FIG. 16 with some components shown in exploded form.
Figure 16:
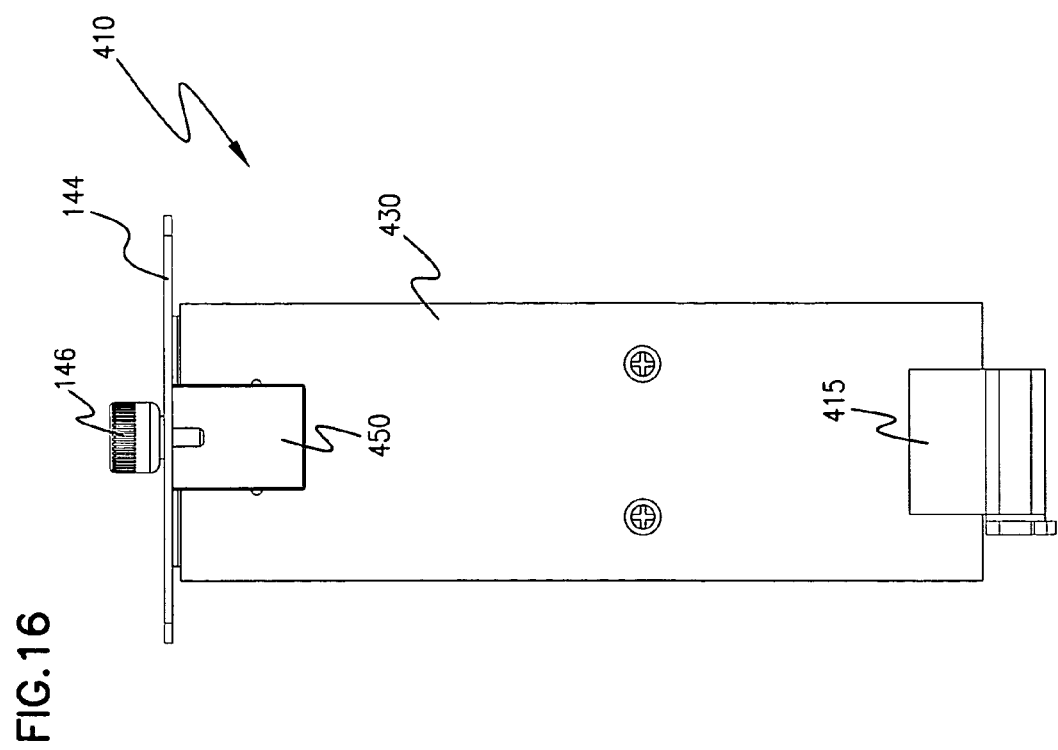
FIG. 16 is a top view of an example CPU line card of the internal components of FIG. 13.

Referring now to FIGS. 16 and 17, CPU line card 410 is illustrated in greater detail. Generally, CPU line card 410 allows unit 100 to be coupled to a network. For example, CPU line card 410 can be configured with an IP address on a network. The CPU line card 410 facilitates communication between the unit 100 and remote devices on the network. In the embodiment shown, the CPU line card 410 can forward statistics associated with the unit 100 to devices on the network, as well as allow remote access to the unit 100.

In one example, the CPU line card 410 can communicate to a remote device on the network when an error condition occurs, such as a failed jack 129 in a module 128. The remote device can then reconfigure the unit 100 by, for example, shutting down the failed jack 129 and/or turning on one or more additional jacks 129.

In the illustrated example, the CPU line card 410 includes a printed circuit board 430 coupled to the CPU cover 144. The printed circuit board 430 includes connector 415 and port 450 mounted thereto. Connector 415 mates with connector 317 on printed circuit board 210 to allow communication between the CPU line card 410 and the printed circuit board 210. Port 450 is visible through aperture 150 of the CPU cover 144 and accepts an ethernet plug of an ethernet cable to connect the CPU line card 410 to, for example, the network.

In the example shown, the CPU line card 410 can be inserted into and removed from the unit 100 without requiring removal of the cover 110. Specifically, to insert the CPU line card 410 into the unit 100, the CPU line card 410 is inserted in the direction A into a cavity 178 formed between the chassis 105 and cover 110 in the back surface 140 of the unit 100. See FIG. 9. Once inserted into the cavity 178, non-conductive CPU guide railways 182, 184 (see FIGS. 11 and 12) formed adjacent to the bottom surface of the chassis 105 guide sides 442, 444 of the printed circuit board 430 of the CPU line card 410 so that the CPU line card 410 can be slid in the direction A until connector 415 is coupled to connector 317 on printed circuit board 310. Fastener 146 on CPU cover 144 can then be tightened to couple the CPU line card 410 to the unit 100. In a like manner, the CPU line card 410 can be removed from the unit 100 by loosening the fastener 146 and sliding the CPU line card 410 in a direction opposite to direction A out of the unit 100.

The unit 100 is configured to recognize when a CPU line card 410 is inserted and/or removed. In one embodiment, the CPU line card 410 can be inserted and removed without requiring the unit 100 to be powered down.

In example embodiments, if the unit does not have a CPU line card 410, a dummy cover plate (not shown) can be coupled to the unit 100 to cover cavity 178. The dummy cover plate can be configured in a manner similar to that of CPU cover 144, except that the dummy cover plate would not include an aperture 154 for port 150.

Figure 18:
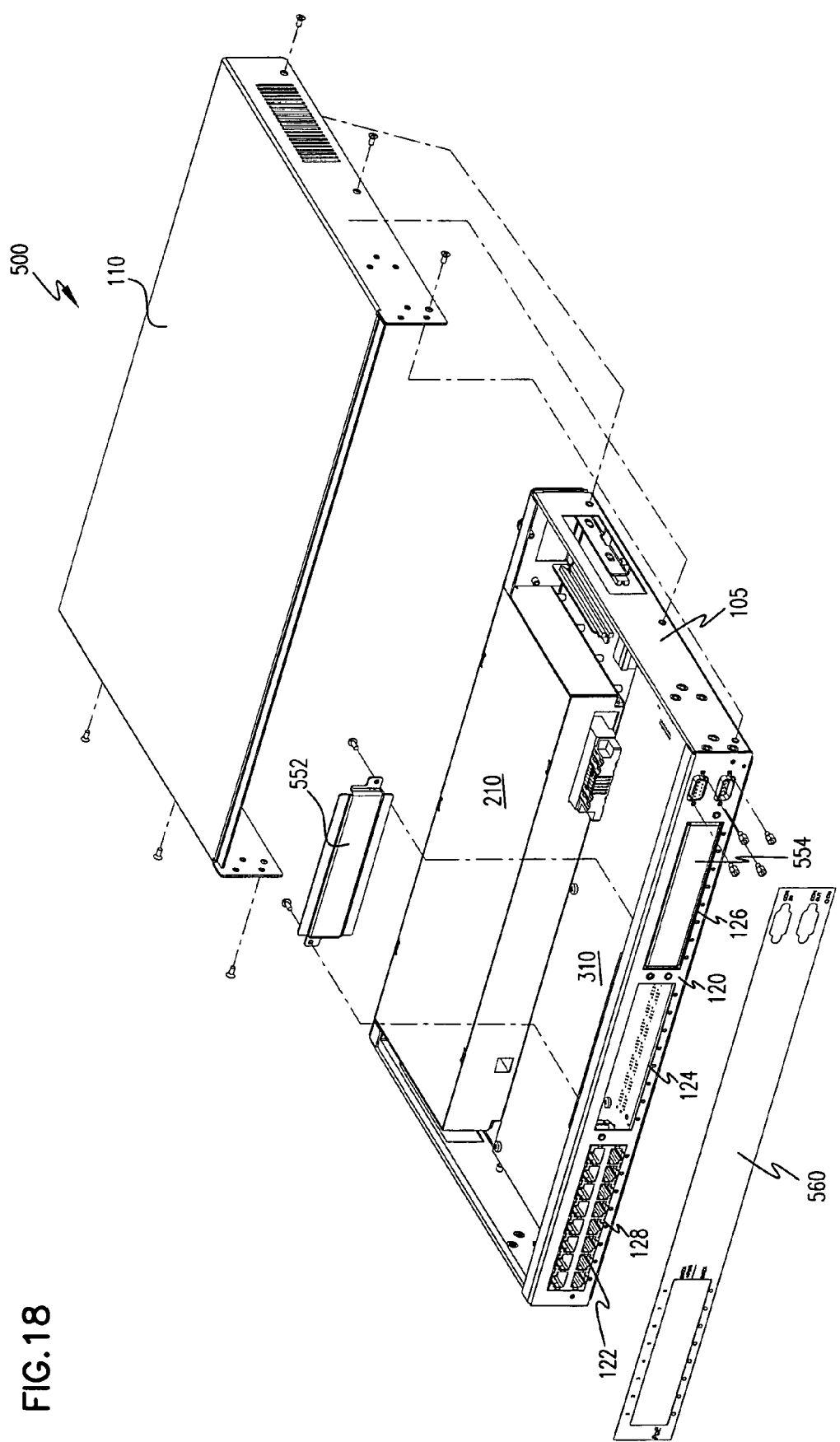
FIG. 18 is a front perspective view of another example power sourcing unit of a power over ethernet system with some components shown in exploded form.
Figure 19:
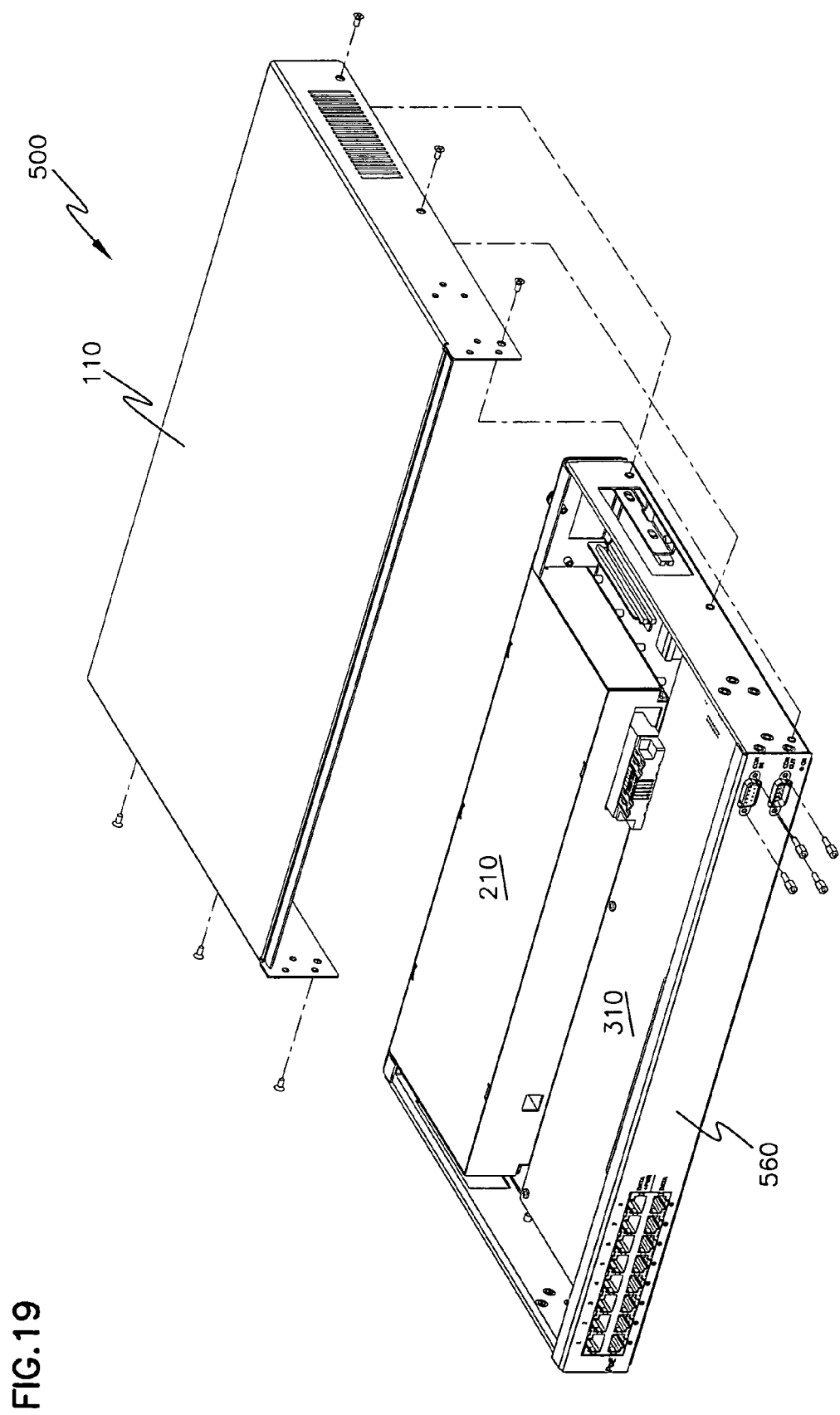
FIG. 19 is another front perspective view of the power sourcing unit of FIG. 18 with some components shown in exploded form.
Figure 20:
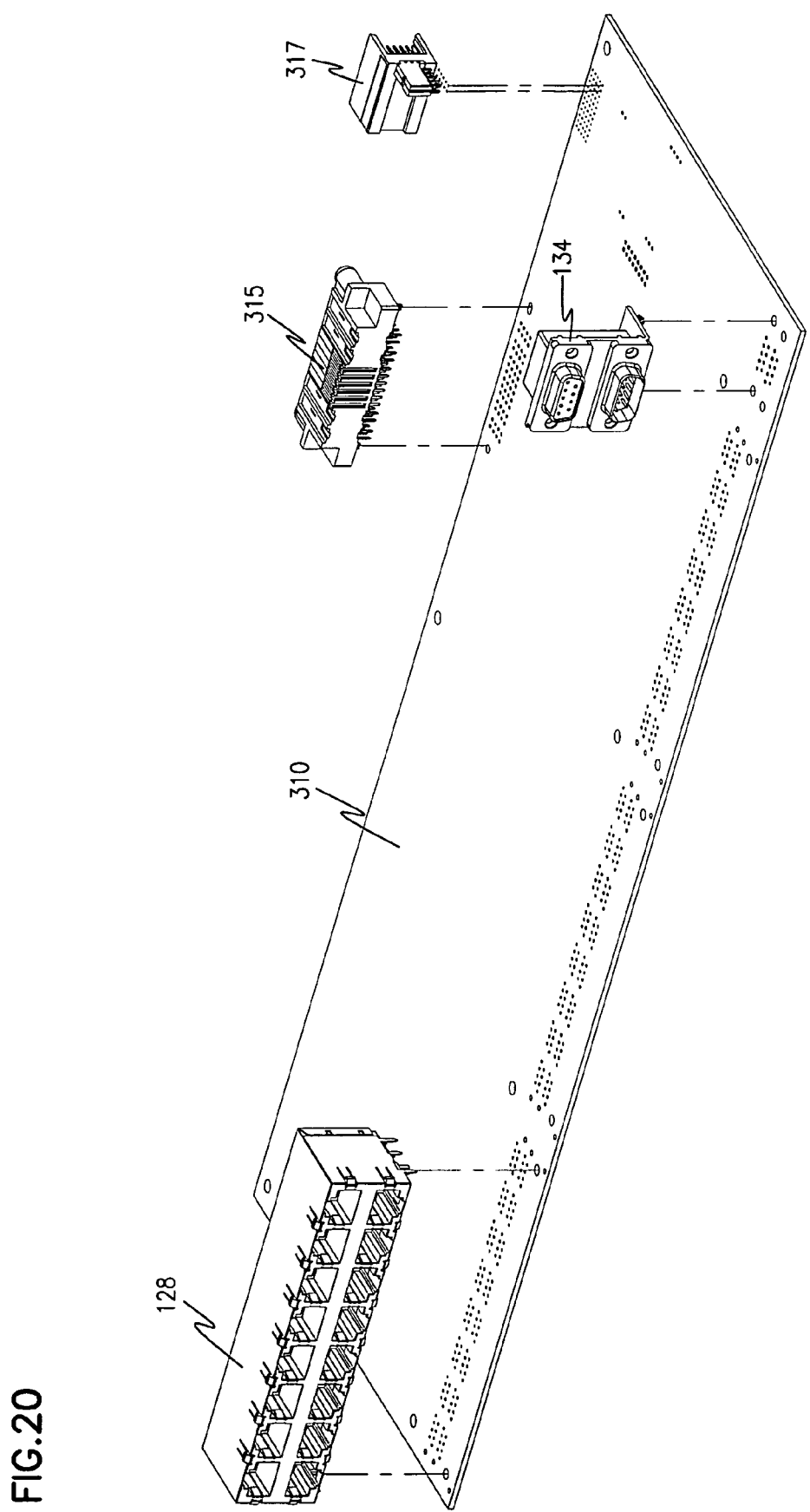
FIG. 20 is a front perspective view of a circuit board of the power sourcing unit of FIG. 18 with some components shown in exploded form.

Referring now to FIGS. 18-20, another embodiment of a power sourcing unit 500 is illustrated. Unit 500 is similar to unit 100 described above, except that only a single port module 128 is provided on printed circuit board 310. Therefore, only aperture 122 includes a port module 128. In the example shown, apertures 124, 126 are therefore covered using blanks 552 and 554. In addition, an overlay 560 is applied to the front surface 120 to mask blanks 552, 554. In other embodiments, two port modules 128 can be provided, and only aperture 126 covered by blank 554. In this manner, a different number of port modules 128 and associated jacks can be provided while maintaining a standard chassis size.

Figure 21:
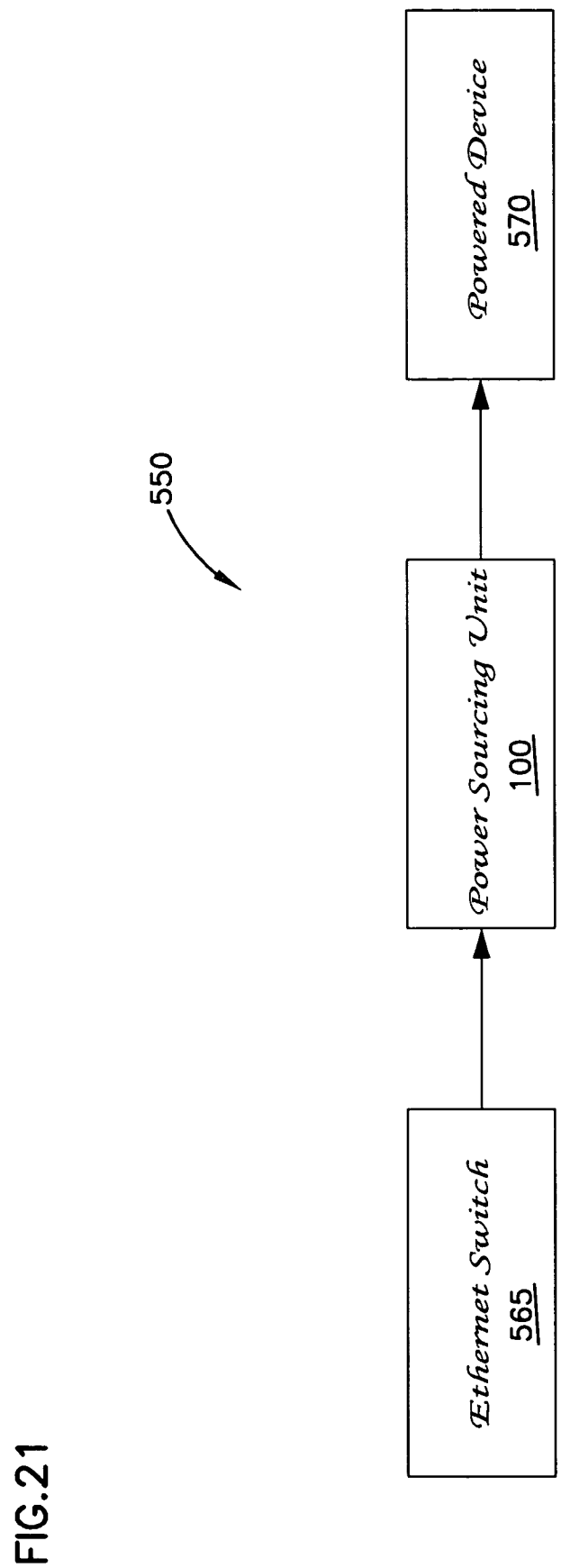
FIG. 21 is a schematic view of an example power over ethernet system including a power sourcing unit.

In example embodiments, as shown in FIG. 21, power sourcing unit 100 can be placed between an ethernet switch 565 and one or more powered devices 570 to supply data signals from the ethernet switch 565, as well as power from unit 100, to the powered device 570.

In addition, more than one power sourcing unit 100 can be used in a power over ethernet system. For example, in FIG. 22, an example power over ethernet system 600 is illustrated including a plurality of power sourcing units 602, 604, 606, 608, and 610. In the example shown, the power sourcing units 602, 604, 606, 608, and 610 are daisy-chained to one another by connecting the COM-out port 132 of one unit to the COM-in port 130 of the next unit.

Generally, in one example embodiment, each unit 602, 604, 606, 608, and 610 is automatically and uniquely assigned an identification code at the time of performance of a boot-up routine in each unit, which is typically initiated in sequence for each unit. Each unit 602, 604, 606, 608, 610 thereby assigns itself a particular identification code and directs the next unit to assign itself an identification code different than the one assigned to itself (such as one greater than the one assigned to itself). For example, the CPLD 194 can provide an identification code to either the CPU line card 410 or the microcontroller 192. The assigned identification code can be used to communicate with a specific unit 602, 604, 606, 608, and 610.

For example, a device can be coupled to the COM-in port 130 of unit 602 to serially communicate with any of units 602, 604, 606, 608, or 610. Power sourcing unit 602 includes a CPU line card 410, which facilitates communication between a device located remotely on a network and units 602, 604, 606, 608, and 610. In this manner, a single IP address can be assigned to a plurality of units 602, 604, 606, 608, and 610 that are daisy-chained together to allow for remote management of the units 602, 604, 606, 608, and 610. In the example shown, a single CPU line card 410 can allow up to five units 602, 604, 606, 608, and 610 to be communicated with remotely.

More or fewer units can daisy-chained together. In addition, the system 600 can be periodically polled to identify if additional power sourcing units have been added or removed from the system. If a power sourcing unit has been added, a unique identification code can be automatically assigned to the new unit.

Additional details regarding the daisy-chaining of multiple units can be found in U.S. patent application Ser. No. 10/308,258, filed on Dec. 2, 2002 and entitled "Systems and Methods for Automatic Assignment of Identification Codes to Devices," the entirety of which is hereby incorporated by reference.

The above specification, examples and data provide a complete description of the manufacture and of the invention. Since many embodiments of the invention can be made without departing from the spirit and scope of the invention, the invention resides in the claims hereinafter appended.

What is claimed is:

1. A power sourcing unit for a power over ethernet system, the unit comprising:
   a chassis having a front and a rear, the chassis defining a power supply guide and a CPU guide;
   a power supply including a power supply connector;

a printed circuit board including first and second connectors at its edge and being coupled to a plurality of jacks at the front; and a CPU line card including a CPU connector;

wherein the power supply guide engages the power supply to allow the power supply to be slid into and out of the rear of the unit to couple the power supply connector to the first edge connector of the printed circuit board; and wherein the CPU guide engages the CPU line card to allow the CPU line card to be slid into and out of the rear of the unit to couple the CPU connector to the second edge connector of the printed circuit board.

2. The unit of claim 1, wherein the power supply guide includes a plurality of guide pins that engage grooves defined by the power supply.

3. The unit of claim 1, wherein the CPU guide includes two railways that guide opposite sides of the CPU line card.

4. A power over ethernet system including first and second power sourcing units, each of the first and second power sourcing units comprising:

a chassis defining a power supply guide and a CPU guide;

a power supply including a power supply connector;

a printed circuit board including first and second connectors at its edge and being coupled to a plurality of jacks;

a CPU line card including a CPU connector; and a COM-in port and a COM-out port;

wherein the power supply guide engages the power supply to allow the power supply to be slid into and out of the unit to couple the power supply connector to the first edge connector of the printed circuit board; and wherein the CPU guide engages the CPU line card to allow the CPU line card to be slid into and out of the unit to couple the CPU connector to the second edge connector of the printed circuit board.

5. The system of claim 4, wherein the first power sourcing unit is coupled to the second power sourcing unit by coupling the COM-out port of the first power sourcing unit to the COM-in port of the second power sourcing unit.

6. The system of claim 4, wherein the system includes a plurality of power sourcing units daisy-chained together.

7. A power sourcing unit for a power over ethernet system, the unit comprising:

a chassis defining a front, and a back defining a power supply cavity and a CPU card cavity;

a power supply including a power supply connector;

a printed circuit board including first and second connectors at its edge and being coupled to a plurality of jacks; and a CPU line card including a CPU connector;

wherein the plurality of jacks are accessible from the front of the chassis; and wherein the power supply is configured to be slid into and out of the power supply cavity at the back of the chassis to couple and uncouple the power supply connector to the first edge connector of the printed circuit board, and wherein the CPU line card is configured to be slid into and out of the CPU card cavity at the back of the chassis to couple and uncouple the CPU connector to the second edge connector of the printed circuit board.

8. The unit of claim 7, wherein the chassis further defines a plurality of guide pins to guide the power supply into and out of the power supply cavity.

9. The unit of claim 7, wherein the chassis further defines two railways to guide the CPU line card into and out of the CPU card cavity.

10. The unit of claim 7, wherein a power supply cover is coupled to the power supply and a CPU cover is coupled to the CPU line card, and wherein the power supply cover substantially covers the power supply cavity and the CPU cover substantially covers the CPU card cavity when coupled to the chassis.

11. The unit of claim 10, wherein the power supply cover and the CPU cover together substantially cover the rear of the chassis.

* * * * *